F. M. BALSLEY.
CULVERT CLEANING HOE.
APPLICATION FILED APR. 14, 1919.

1,376,995.

Patented May 3, 1921.

Inventor
Frederick M. Balsley
By Erwin Wheeler & Woolard
Attorneys

Witness

UNITED STATES PATENT OFFICE.

FREDERICK M. BALSLEY, OF MADISON, WISCONSIN.

CULVERT-CLEANING HOE.

1,376,995.  Specification of Letters Patent.  Patented May 3, 1921.

Application filed April 14, 1919. Serial No. 290,009.

*To all whom it may concern:*

Be it known that I, FREDERICK M. BALSLEY, a citizen of the United States, residing at Madison, county of Dane, and State of Wisconsin, have invented new and useful Improvements in Culvert-Cleaning Hoes, of which the following is a specification.

My invention relates to improvements in culvert cleaning hoes.

The object of my invention is to provide a form of hoe which will fold, or swing in the direction of the shank or handle when it is being pushed into a culvert, or other cavity from which material is to be withdrawn, and which will then swing into position to engage and withdraw such material while it is being drawn out. My improved hoe is therefore adapted to be pushed into a culvert which has so nearly filled with gravel, sand or other material that an ordinary hoe could not be inserted, but when withdrawn, my improved hoe operates in exactly the same manner and with the same efficiency as an ordinary hoe to remove such material as may be engaged.

In the drawings:—

Like parts are identified by the same reference characters throughout both views.

Figure 1:
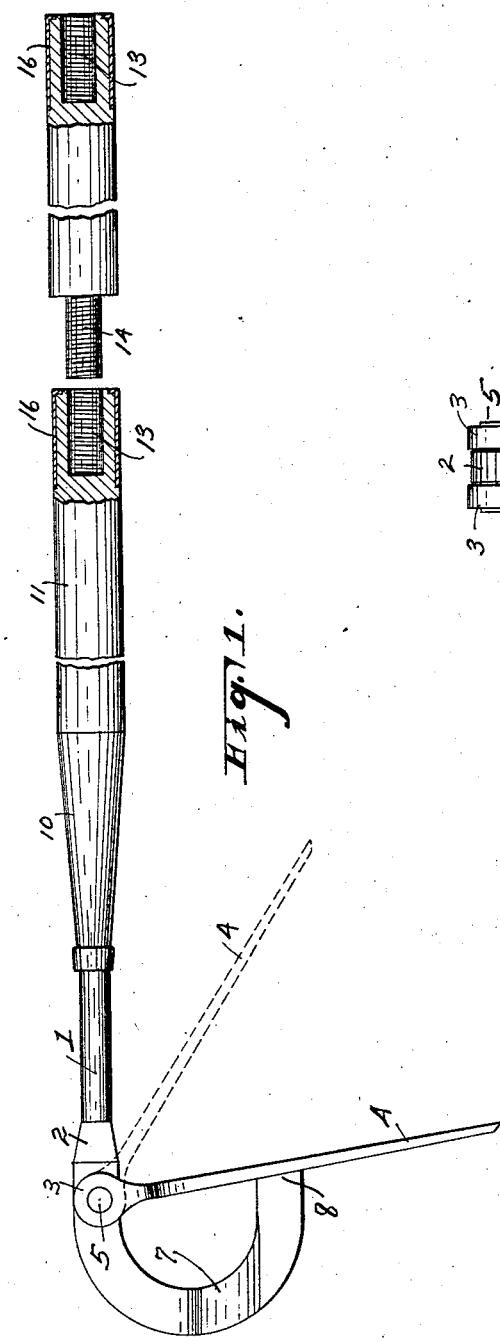
Figure 1 is a side view of my improved hoe showing portions of the handle in longitudinal section and illustrating a handle composed of detachable or extensible sections, the hoe blade being also illustrated by full lines in scraping position, and by dotted lines in a partially folded position.

My improved hoe comprises a shank 1, preferably flattened and enlarged at 2, the side faces of the portions 2 being adapted to loosely fit between a pair of upwardly projecting ears 3 carried by the hoe blade 4, whereby the hoe blade may be secured to the shank by an ordinary pivot pin 5.

At the rear of the pivot pin 5 the shank curves downwardly, and is preferably forked, the fork arms 7 extending downwardly and divergently, and also curving forwardly as shown in Fig. 1, with extremities 8 adapted to serve as stops or bearings for the blade of the hoe to limit its backwardly swinging movement upon the pivotal axis at 5.

It will be observed that the bearings at 8 are located at a substantial distance below the upper margin of the blade 4, and also at a substantial distance from the lower margin of the blade. By providing two bearings 8, spaced apart at each side of the center of the blade, the pivot pin 5, and the ears 3 are substantially relieved from twisting or cramping strains, and by locating the bearings 8 at a substantial distance below the upper margin of the blade, the resistance of the material to the movement of the blade when the hoe is being withdrawn from a culvert will be borne largely by the arms 7 of the shank, and a pivot pin of comparatively cross section can therefore be used without danger of shearing.

The shank 1 is provided with an ordinary ferrule 10 to receive a handle 11. This handle is preferably formed in sections, each of the inner sections having a screw threaded socket 13 in its outer end, and the next section having an axially projecting screw 14, adapted to fit said socket in engagement with the threads thereof. If the handle is formed of wood, the socketed portions will preferably be inclosed by a ferrule 16.

By thus making the handles in detachable sections the hoe may be used in culverts of considerable length, and when used in short culverts the handle may be reduced in length in accordance with the requirements, and to avoid the use of a handle of an unwieldy length.

Figure 2:
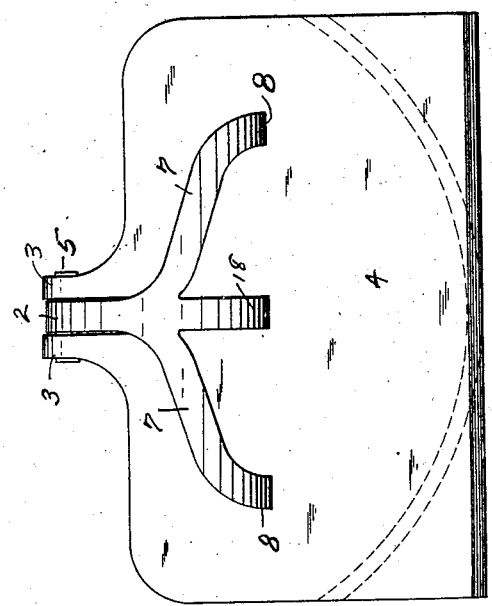
Fig. 2 is a rear view of my improved hoe with dotted lines indicating a modified contour.

It is not material to my invention whether the blade 4 is of a general rectangular form, or whether its cutting edge, *i. e.*, its lower edge, is straight, as indicated by full lines in Fig. 2, or curved, as indicated by dotted lines. It is also not essential that the forked arms 7 should be used. If the shank 2 is itself curved downwardly and forwardly as shown at 18, in Fig. 2, to provide a stop in the vertical plane which includes the axis of the shank, it is merely necessary that the shank should be provided with some form of stop to limit the backwardly swinging movement of the whole blade.

The mode of operation of my improved device will be readily understood from the above description, taken in connection with the illustration. When the hoe is being pushed into a culvert, or into a recess to be cleaned from accumulated material, the blade 4 will freely swing toward the shank, as indicated by the dotted lines in Fig. 1, thereby allowing it to ride over the material without resistance if the unfilled space is of sufficient dimensions. If not, the blade will readily cut into the material after swinging to nearly a horizontal position.

After pushing the hoe into the culvert to a point where the blade is in position to engage and withdraw material, a pull upon the handle will cause the lower edge of the blade to engage the material, whereupon a continued pull upon the handle will cause the blade to swing upon the pivot pin 5, until it engages the stop or stops carried by the shank or the shank arms 7 at the rear side of the blade. Thereafter, the hoe will operate in exactly the same manner as any ordinary hoe to draw the material out from the culvert.

I claim:—

1. The combination with a hoe blade, of a shank pivotally connected with the upper margin of the blade, and provided with a rearward extension curving downwardly and forwardly, and adapted to serve as a stop to hold the blade in a normal scraping position, said shank being forked and adapted to bear upon the rear face of the blade at a plurality of points, at opposite sides of the center of the blade.

2. A culvert cleaning hoe comprising a handle, a member attached thereto, said member having a straight portion adjacent the point of attachment with the handle and a curved portion extending therefrom, a hoe blade pivotally attached to said straight portion and arranged to either fold against the handle or else to extend at right angles to said handle and to bear against the said curved portion.

3. A culvert cleaning hoe comprising a hoe blade having the center portion of its outer margin provided with a pair of upwardly projecting ears, a shank pivotally connected with said ears, and provided with a forwardly projecting handle receiving portion, said shank continuing rearwardly of said pivotal point and downwardly to form an integral bracing means for said hoe blade.

In testimony whereof I affix my signature in the presence of two witnesses.

FREDERICK M. BALSLEY.

Witnesses:
A. L. HAMBRECHT,
R. W. MORGAN.